(12) United States Patent
Kolb et al.

(10) Patent No.: US 11,859,411 B2
(45) Date of Patent: Jan. 2, 2024

(54) PORTABLE LOCK

(71) Applicant: ABUS August Bremicker Soehne KG, Wetter-Volmarstein (DE)

(72) Inventors: Marcus Kolb, Girod (DE); Marvin Mueller, Salz (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 706 days.

(21) Appl. No.: 16/408,293

(22) Filed: May 9, 2019

(65) Prior Publication Data

US 2019/0368234 A1 Dec. 5, 2019

(30) Foreign Application Priority Data

May 11, 2018 (DE) .......................... 102018111296.3

(51) Int. Cl.
| | | |
|---|---|---|
| *E05B 71/00* | (2006.01) | |
| *B62H 5/00* | (2006.01) | |
| *H04W 12/06* | (2021.01) | |
| *B62M 6/90* | (2010.01) | |
| *E05B 47/00* | (2006.01) | |

(52) U.S. Cl.
CPC ............ *E05B 71/00* (2013.01); *B62H 5/001* (2013.01); *H04W 12/06* (2013.01); *B62M 6/90* (2013.01); *E05B 2047/0095* (2013.01)

(58) Field of Classification Search
CPC . E05B 71/00; E05B 2047/0095; B62H 5/001; Y10T 70/5872; H04W 12/16; H04W 12/06
See application file for complete search history.

(56) References Cited

U.S. PATENT DOCUMENTS

| | | | | |
|---|---|---|---|---|
| 6,318,138 | B1 * | 11/2001 | Mathews | ............ E05B 47/0012 |
| | | | | 70/279.1 |
| 7,336,150 | B2 * | 2/2008 | Gokcebay | ............... E05B 47/06 |
| | | | | 70/432 |
| 8,616,031 | B2 * | 12/2013 | Ullrich | ................ E05B 47/0676 |
| | | | | 70/279.1 |

(Continued)

FOREIGN PATENT DOCUMENTS

| | | | |
|---|---|---|---|
| CA | 3040010 | * | 4/2018 |
| CH | 702 459 A2 | | 6/2011 |

(Continued)

OTHER PUBLICATIONS

German Search Report dated Feb. 11, 2019 in related German Patent Application No. 10 2018 111 296.3 (nine pages).

(Continued)

*Primary Examiner* — Christine M Mills
*Assistant Examiner* — Yahya Sidky
(74) *Attorney, Agent, or Firm* — Kilpatrick Townsend & Stockton LLP

(57) ABSTRACT

The disclosure relates to a portable lock having an unlocking motor, an authentication for authenticating the user of the lock, and an actuation element that can be actuated by the user to activate the unlocking motor to unlock the lock after a successful authentication of the user. A further subject matter is a locking system having such a lock and a mobile end device to allow a user of the lock to authenticate himself thereat. The disclosure also relates to a method of unlocking a mobile lock.

13 Claims, 4 Drawing Sheets

(56) References Cited

U.S. PATENT DOCUMENTS

Figure 1:
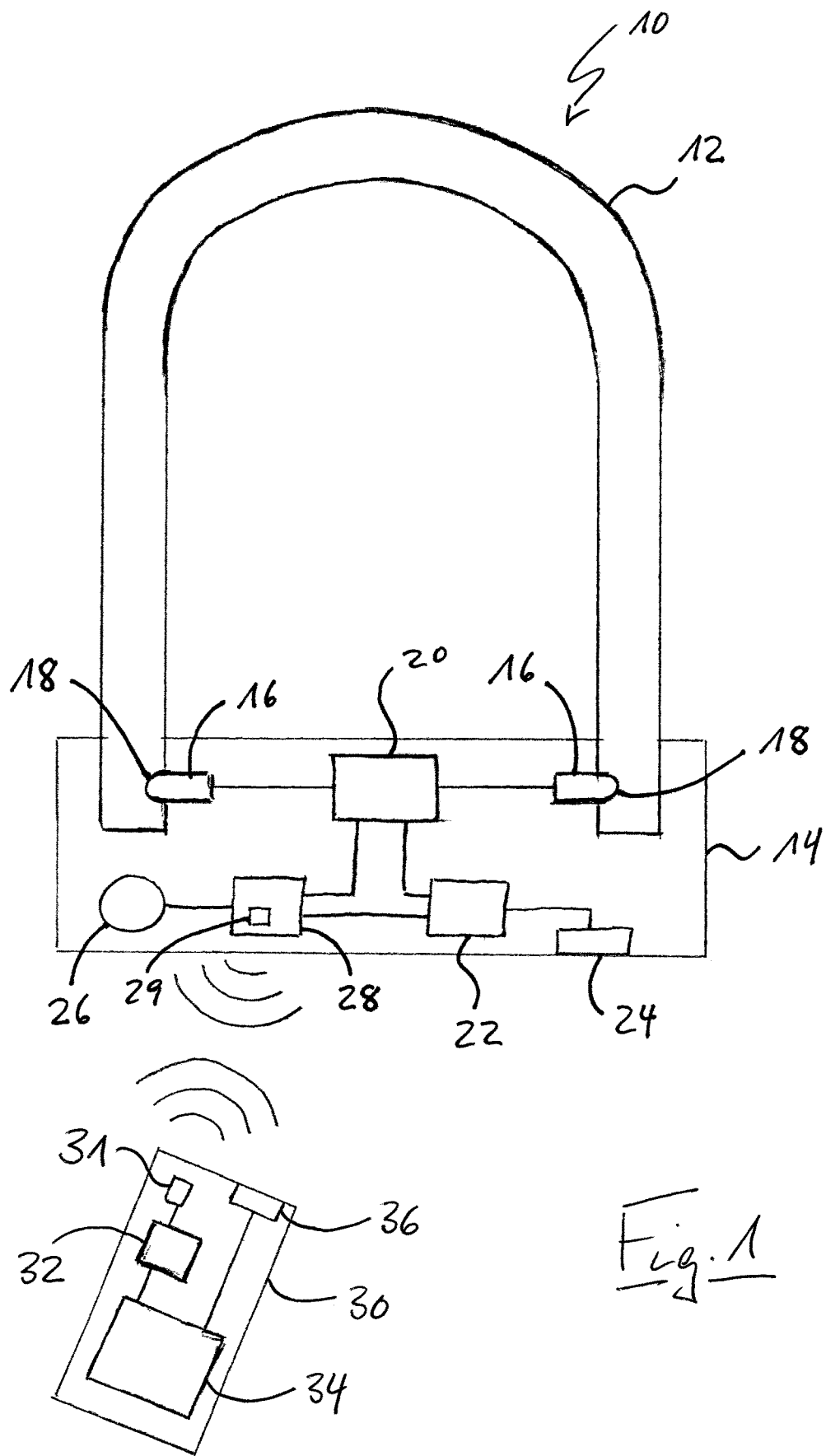

| | | | | |
|---|---|---|---|---|
| 8,875,550 | B1* | 11/2014 | Spunt | E05B 67/22 |
| | | | | 70/53 |
| 9,523,218 | B1* | 12/2016 | McGraw | E05B 39/005 |
| 10,832,507 | B2* | 11/2020 | Kolb | G07C 9/00309 |
| 2006/0238294 | A1* | 10/2006 | Gokcebay | E05B 47/06 |
| | | | | 70/432 |
| 2008/0024272 | A1 | 1/2008 | Fiske | |
| 2009/0113961 | A1* | 5/2009 | Muller | B60R 25/24 |
| | | | | 340/5.26 |
| 2014/0250954 | A1* | 9/2014 | Buzhardt | G07C 9/00 |
| | | | | 70/20 |
| 2014/0266588 | A1 | 9/2014 | Majzoobi | |
| 2014/0318198 | A1* | 10/2014 | Gokcebay | E05B 65/46 |
| | | | | 70/278.1 |
| 2014/0360232 | A1 | 12/2014 | Al-Kahwati et al. | |
| 2016/0076278 | A1* | 3/2016 | Morosawa | E05B 77/18 |
| | | | | 70/263 |
| 2016/0090754 | A1* | 3/2016 | Mohamed | B62H 5/141 |
| | | | | 70/15 |
| 2016/0116510 | A1 | 4/2016 | Kalous et al. | |
| 2016/0133071 | A1* | 5/2016 | Henderson | G07C 9/0069 |
| | | | | 70/277 |
| 2018/0118294 | A1* | 5/2018 | Anuth | B62H 5/003 |
| 2019/0371097 | A1* | 12/2019 | Kolb | E05B 67/063 |
| 2020/0242868 | A1* | 7/2020 | Gengler | G07C 9/00174 |
| 2021/0396043 | A1* | 12/2021 | Neveling | E05B 45/005 |

FOREIGN PATENT DOCUMENTS

| | | | |
|---|---|---|---|
| CN | 101145249 A | | 3/2008 |
| CN | 109923034 A | | 6/2019 |
| DE | 10 2011 081 207 A1 | | 2/2013 |
| DE | 10 2012 100 110 A1 | | 7/2013 |
| DE | 10 2013 013 087 A1 | | 2/2014 |
| DE | 20 2016 002 087 U1 | | 4/2016 |
| DE | 20 2016 002 087 U1 | | 5/2016 |
| DE | 20 2016 002 367 U1 | | 5/2016 |
| DE | 10 2015 119 187 A1 | | 5/2017 |
| DE | 102015121715 | * | 6/2017 |
| DE | 10 2016 104 674 A1 | | 9/2017 |
| DE | 10 2016 119 570 A1 | | 4/2018 |
| EP | 3 010 791 A2 | | 4/2016 |
| WO | 2014/205345 A2 | | 12/2014 |

OTHER PUBLICATIONS

European Search Report dated Sep. 25, 2019 in corresponding European Patent Application No. 19172290.9 (seven pages).
Chinese Office Action dated Oct. 8, 2021 in corresponding Chinese Patent Application No. 201910387370.8 (16 pages).
European Office Action dated Jan. 21, 2021 in corresponding European Patent Application No. 19172290.9 (five pages).

* cited by examiner

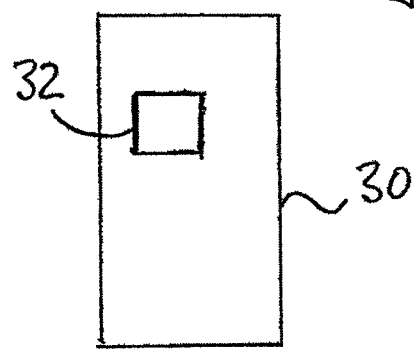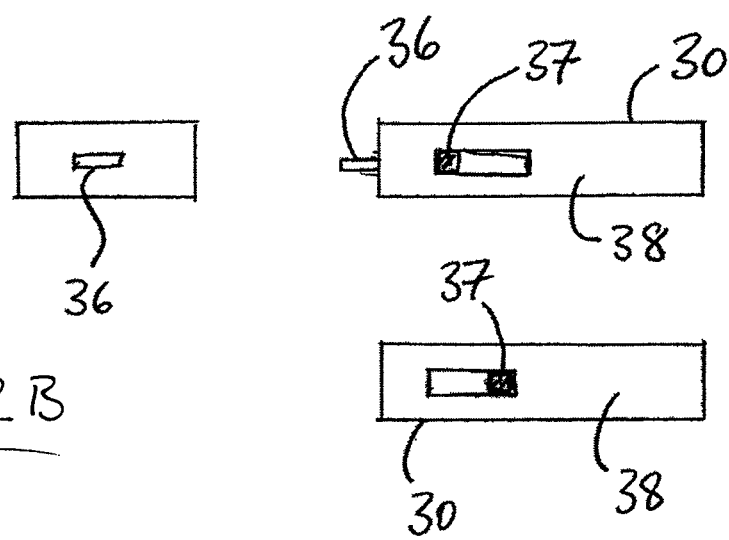

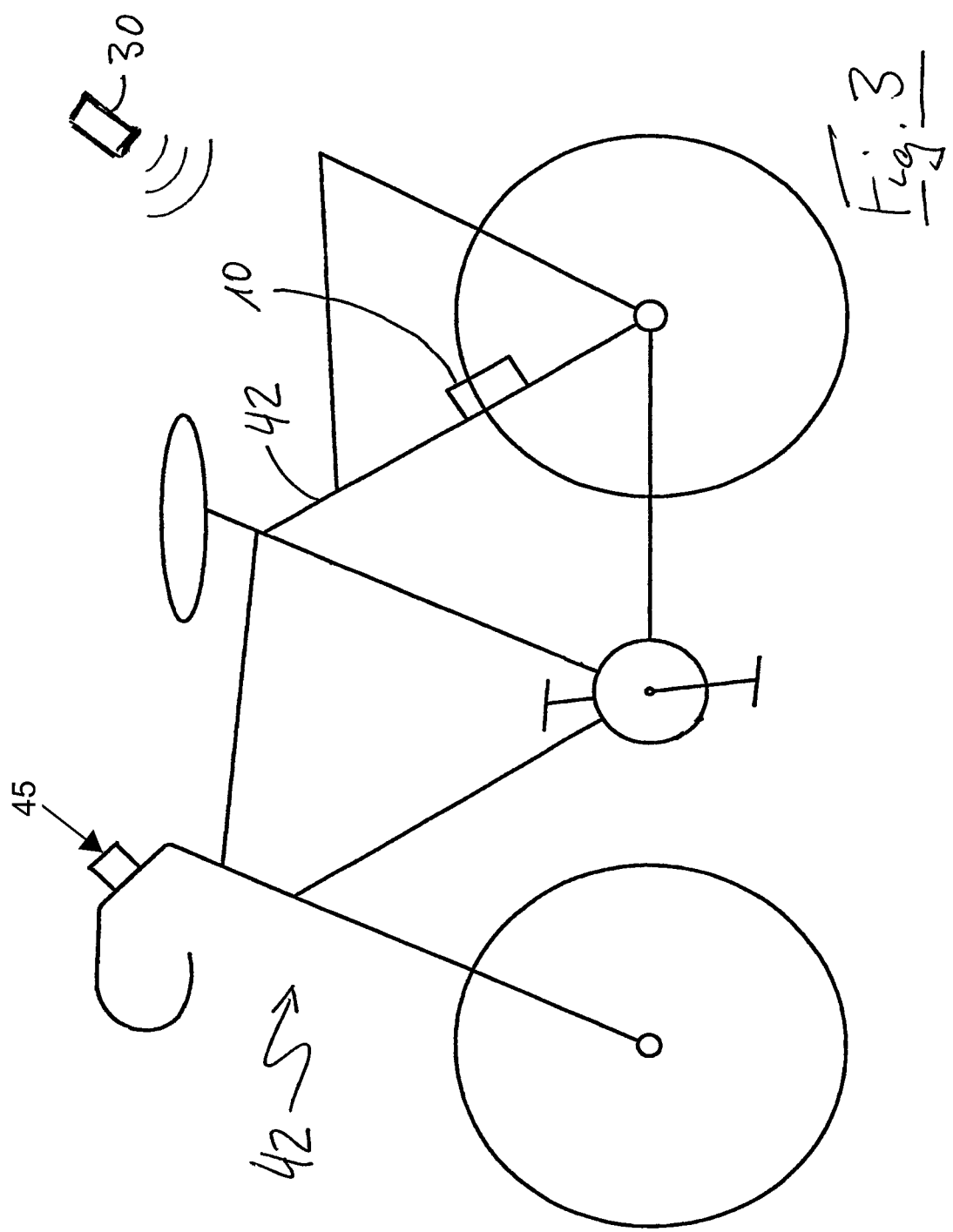

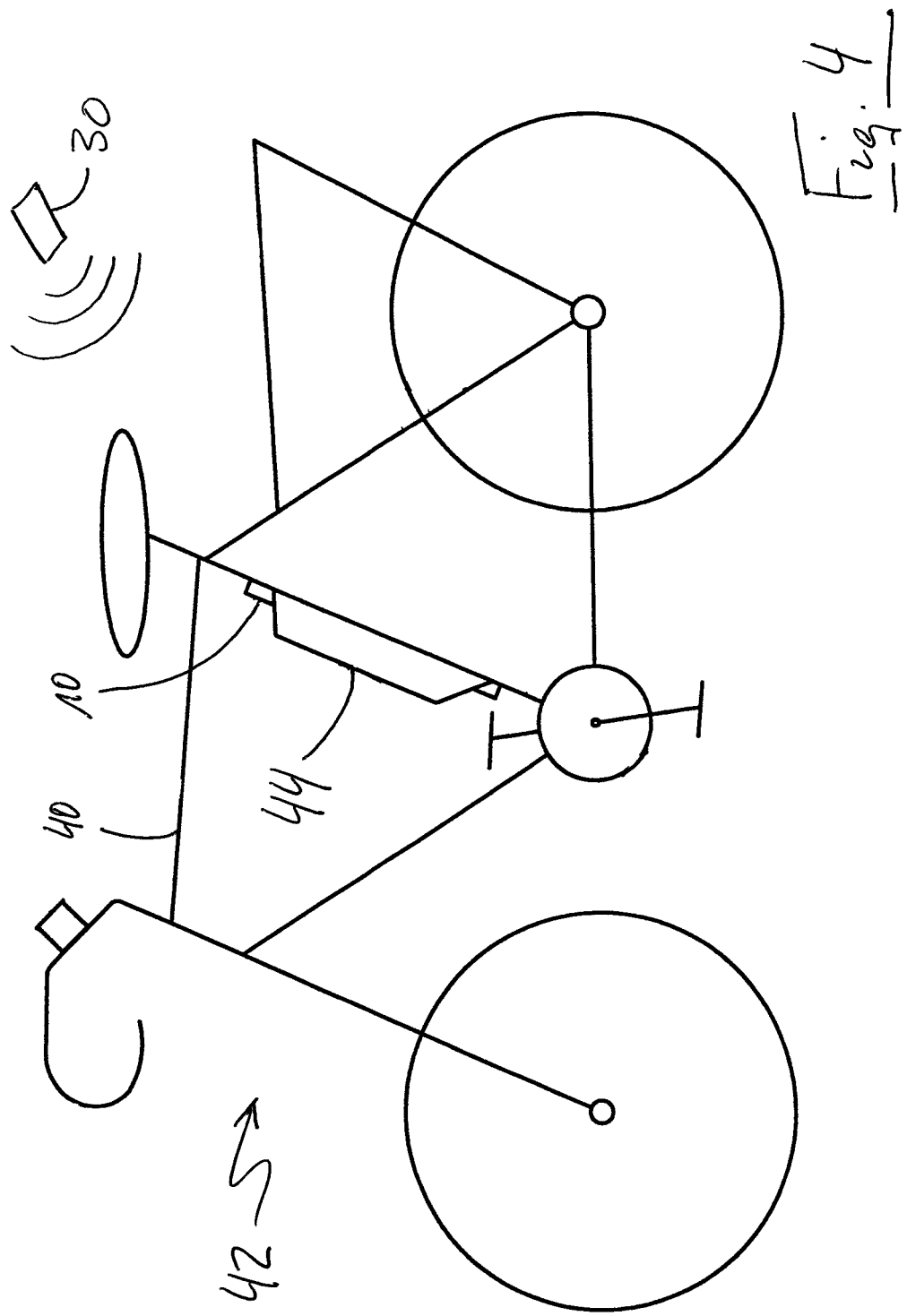

PORTABLE LOCK

This application claims priority to German Patent Application No. 102018111296.3, filed May 11, 2018, the disclosure of which is incorporated by reference herein.

The invention relates to a portable lock. A portable lock is understood in this context as every kind of lock that is not installed in a stationary manner in a building or in a motor vehicle, but can rather be removed from an object to be locked such as a padlock, a hoop lock, or a cable lock. Portable locks in this context furthermore also include frame locks or battery compartment locks that are attached to two-wheelers or to three-wheelers, in particular to bicycles. Such portable locks are generally known.

It is the underlying object of the invention to make the use of a portable lock more comfortable.

A portable lock having the features herein is provided to satisfy this object.

The portable lock in accordance with the invention comprises an unlocking motor, an authentication module to authenticate a user of the lock, and an actuation element that can be actuated by the user and by means of which the unlocking motor can be activated to unlock the lock on a successful authentication of the user.

It is the underlying object of the invention not to unlock the lock as conventionally usual by means of a key, but instead to provide an unlocking motor that can be activated by the user. The lock is therefore an electronic lock.

So that it is ensured that only an authorized user can unlock the lock, it additionally has an authentication module to authenticate the user. In this manner, the user no longer needs to carry a physical key with him to unlock the lock, whereby not only the comfort of use is increased, but simultaneously the risk of loss or theft of the key is also dispensed with.

The authentication of the user ideally takes place in the background unnoticed by him. To prevent an unintentional unlocking of the lock on a successful authentication of the user, for example when the user is located within a distance from the lock enabling the authentication, but when he does not intend to unlock the lock, the user therefore has to carry out a conscious action in the case of an actually desired unlocking of the lock in that he actuates the actuation element.

It is understood that not only the unlocking of the lock is possible on a successful user authentication and actuation of the actuation element, but also a locking of the lock is conceivable in the same manner.

Advantageous embodiments of the invention can be understood from the description and drawings herein.

The authentication preferably takes place wirelessly to be able to perform the authentication of the user in the background unnoticed by him. For authentication purposes the user therefore does not need to separately take out a mobile end device enabling the authentication that he carries with him for the authentication such as a remote control, a smartphone, or a smart watch, but can rather leave it in his pocket.

In addition, the wireless authentication makes it possible for the user generally already to be able to be authenticated on an approach toward the lock so that the closing motor can be actuated without a time delay on an actuation of the actuation element, which contributes to an increased comfort in use. It is understood that for such an early authentication of the user the authentication module always has to be kept in an alert state in which it for its part transmits signals for the detection of users possibly present in the vicinity and/or can respond to identification queries of users present in the vicinity. This permanent keeping alert of the authentication module is, however, achieved at the cost of an energy supply of the portable lock and can in the worst scenario have the result that an energy store for the lock can no longer deliver sufficient energy to the closing motor to unlock the lock. It is understood that such an operation of the authentication module is less critical in a portable lock that is connected to the traction battery of an e-bike or of an electric scooter for the energy supply since the traction battery is anyway regularly charged and the risk of an absence of current or voltage of the lock is normally precluded. Such a lock can, for example, be a frame lock or a batter compartment lock.

An embodiment is preferred, in particular when the lock is not connected to the traction battery of an e-bike or of an electric scooter, for example when the lock is a removable hoop lock, padlock, cable lock, or frame lock of a conventional two-wheeler, in which the authentication module can be activated by actuating the actuation element. The authentication module can in this manner be moved into a passive state consuming no energy after ending an authentication process or unlocking process to conserve an energy store of the lock. The authentication module is only woken up again so-to-say by actuation of the actuation element to perform a pairing with a mobile end device of the user that may be present in the vicinity and to carry out an authentication process. Depending on how fast the waking up of the authentication module, the pairing of the authentication module and the mobile end device, and the actual authentication take place, the lock is only unlocked with a certain time delay after actuating the actuation element in this case.

The authentication module advantageously comprises a transmission/reception unit to establish a wireless connection to a mobile end device of the user. The mobile end device can be a remote control associated with the lock or also a portable computer that the user normally anyway carries with him, for example a smartphone, a smart watch, or a tablet.

The wireless connection is preferably a Bluetooth connection. Bluetooth connections have in particular proven themselves with respect to range and universality.

The actuation element can be actuable by contact or also contactlessly. For example, the actuation element can be formed by an impulse generator, in particular a button, preferably a push button or a slider button, and/or by an optically acting, capacitively acting, or inductively acting control surface.

In accordance with an embodiment, the actuation element is formed at the lock. This enables a particularly intuitive operation of the lock.

Alternatively or additionally, the authentication module can also be actuable by attachment of an onboard computer (e.g., an element 45 in FIG. 3) to a bicycle. In this case, the onboard computer (e.g., the element 45 in FIG. 3) so-to-say itself forms the actuation element, that is no additional actuation element has to be provided at the lock. This embodiment has proven to be particularly advantageous when the lock is a frame lock or a battery compartment lock of an e-bike with which the user typically removes the onboard computer (e.g., the element in FIG. 3) and takes it with him when leaving the e-bike.

It is understood that just the attachment of the onboard computer (e.g., the element 45 in FIG. 3) to the bicycle does not have to result in an activation of the authentication module. An actuation element can rather be formed at the onboard computer in the form of a button, switch, or slider, or an optically acting, capacitively acting or inductively acting control that the user has to activate to trigger the activation of the authentication module. Depending on the embodiment, an effective actuation of such an actuation element can only be possible after attachment of the onboard computer (e.g., the element 45 in FIG. 3) to a vehicle or even beforehand.

Alternatively or additionally, the actuation element can also be formed at the mobile end device of the user and can communicate wirelessly, in particular via Bluetooth, with the lock to wake up the authentication module and/or to activate the closing motor. In each case, the communication between the onboard computer (e.g., the element 45 in FIG. 3) and the lock can take place wirelessly, in particular via Bluetooth, or wired, in particular via a holder for the on board computer (e.g., the element 45 in FIG. 3) fastened to the bicycle.

In accordance with an even further embodiment, the actuation element is formed by a sensor for detecting a movement of the lock arranged in the lock and connected to the authentication module. In this case, the user has to actively move the lock to trigger the authentication procedure or the activation of the closing motor. It is understood that such a configuration of the fastening element is more suitable for a hoop lock, a padlock, or a cable lock than for a frame lock or for a battery compartment lock.

In accordance with an even further embodiment, the lock comprises a sensor for detecting a movement of the lock and an alarm module that is connected to the sensor and to the authentication module and that outputs an alarm, in particular an acoustic alarm, in the event of a movement of the lock detected by the sensor and of an unsuccessful user authentication. Theft protection is substantially increased by such an alarm function.

The same sensor is preferably provided for the detection of a movement of the lock as an actuation element and for the alarm function since it satisfies a dual function in a particularly economic manner in this case.

The unlocking motor is preferably an electric motor. It is understood that the portable lock preferably has an energy store for supplying the unlocking motor, the authentication module, and optionally the actuation element with energy. The energy store can thus, for example, be a battery respectively a rechargeable battery.

A further subject matter of the invention is a locking system having a portable lock of the above-described kind and having a mobile end device by means of which a user of the lock can be authenticated thereat. The advantages named above in connection with the portable lock apply accordingly to the locking system in accordance with the invention.

So that the mobile end device can communicate with the authentication module of the lock, the mobile end device advantageously also comprises a transmission/reception unit to establish a wireless connection to the authentication module of the lock.

As already mentioned, the mobile end device can be a remote control or a portable computer, in particular a smart watch, a smartphone, a tablet, etc.

In accordance with an embodiment, the portable end device has an energy store by which the lock can at least be supplied with sufficient energy for an emergency unlocking. The lock can then also still be unlocked in this manner if it is itself fully without current or voltage, for example because a battery of the lock is defective or because the user has forgotten to charge a rechargeable battery of the lock in time.

The energy store of the mobile end device in other words therefore ensures an emergency power supply/emergency voltage supply.

To implement such an emergency power/voltage supply, the lock and the mobile end device preferably have complementary connector elements by means of which the mobile end device can be connected to the lock to supply the lock with energy.

The connector elements can, for example, comprise a USB plug and a USB socket.

In particular when the mobile end device is a remote control associated with the lock, the connector element of the mobile end device can be movable between a passive position in which it is protected in a housing of the mobile end device and an active position in which it at least partly projects out of the housing and is couplable to the connector element of the lock.

A further subject matter is a method of unlocking or locking a portable lock that has an unlocking motor, an authentication module, and an actuation element that can be actuated by a user, in which method an authentication of the user is carried out by means of the authentication module and the unlocking motor for unlocking the lock is activated in the event of a successful authentication of the user and of an additional actuation of the actuation element. The aforesaid advantages can be achieved accordingly by the method in accordance with the invention.

As already mentioned, the authentication of the user advantageously takes place wirelessly and in particular via a Bluetooth connection between the authentication module and a mobile end device of the user.

In this process, the authentication of the user can already be carried out before the actuation of the actuation element, which, however, requires that the authentication module is permanently active, and detects the presence of potential users.

In accordance with a more energy-efficient embodiment, the authentication module is activated by the actuation of the actuation element and the authentication of the user is only carried out after the actuation of the actuation element. In this case, the authentication module can normally adopt an energy-saving passive state and can only be woken up to carry out an authentication procedure.

The invention will be described in the following purely by way of example with reference to possible embodiments and to the enclosed drawing. There are shown:

FIG. 1 a schematic representation of a locking system in accordance with a first embodiment of the invention;

FIG. 2A a plan view of a remote control of the locking system of FIG. 1;

FIG. 2B a front view of the remote control of FIG. 2A;

FIG. 2C a side view of the remote control of FIG. 2A with an extended connector element;

FIG. 2D a side view of the remote control of FIG. 2A with a retracted connector element;

FIG. 3 a schematic representation of a locking system in accordance with a second embodiment of the invention; and FIG. 4 a schematic representation of a locking system in accordance with a third embodiment of the invention.

The locking system shown in FIG. 1 comprises a portable lock 10 in the form of a hoop lock comprising a U-shaped closing hoop 12 whose ends are received in a lock body 14 and locked therein in a locked state of the lock 10.

The locking of the closing hoop 12 in the lock body 14 takes place by means of locking elements 16 that are movably supported in the lock body 14, that engage in corresponding locking recesses 18 of the closing hoop 12, and there thereby prevent the closing hoop 12 from being able to be pulled out of the lock body 14.

To unlock the lock 10, the locking elements 16 can be released, for example against the return force of locking springs that are not shown and that preload the locking elements in the direction of the locking recesses 18, from the locking recesses 18 by means of an unlocking motor 20, here in the form of an electric motor, that is arranged in the lock body 14.

Since the locking of the closing hoop 12 in the lock body 14 is effected by the locking springs that displace the locking elements 16 into the locking recesses 18 and since the unlocking motor 20 ultimately only provides the unlocking of the lock 10, the lock 10 is also called a semi-automatic lock 10. A fully automatic lock is, however, generally also conceivable in which the unlocking motor 20 provides both the unlocking and the locking.

An energy store 22 is accommodated in the lock body 14 for the energy supply of the electric motor 20. In the present embodiment, the energy store 22 is a rechargeable battery that can be charged by means of a connector element, here in the form of a USB socket, that is accessible from the outside. Alternatively, however, the energy store 22 could also be a battery that can be replaced as required.

An actuation element 26 that is accessible to the user is provided at the lock body 14 for the triggering of an unlocking procedure and is configured in the present embodiment in the form of a capacitively acting sensor surface. Alternatively, the actuation element 26 could also be an optically acting or inductively acting control or a rotatable knob, a push button, a rocker switch, or slider switch. It is furthermore conceivable to configure the actuation element 26 in the form of a motion sensor. The actuation of the actuation element 26 would in this case take place by a movement of the lock 10.

The actuation element 26 is connected to an authentication module 28 that is accommodated in the lock body 14 and that is in turn connected to the electric motor 20. The authentication module 28 is activated by actuating the actuation element 26 so that the authentication module 28 carries out an authentication process. For this purpose, the authentication module 28 first establishes a Bluetooth connection by means of a transmission/reception unit 29 to a mobile end device 30 that a user of the lock 10 carries with him for this purpose.

In the present embodiment, the mobile end device 30 is a Bluetooth enabled remote control (see also FIG. 2) that in turn has a transmission/reception unit 31 and that can be switched on by means of a switch-on element 32. The remote control can also have a motion sensor, not shown, for example a 3D positional sensor, for detecting a movement of the remote control that makes it possible to wake up the remote control on detection of a movement after it has changed into an energy-saving passive state after its use.

Alternatively, the mobile end device 30 could, however, also be formed by a smart watch, a smartphone, or another Bluetooth enabled portable computer.

As soon as the authentication module 28 has established a Bluetooth connection to the mobile end device 30, it carries out an authentication of the mobile end device 30. In the event of a positive authentication, the authentication module 28 transmits a release signal to the electric motor 20 so that is can move the locking elements 16 and the closing hoop 12 out of engagement for the unlocking of the lock 10.

If, in contrast, the mobile end device 30 is not positively authenticated, the authentication module 28 does not transmit a release signal to the unlocking motor 20, i.e. the lock 10 is not unlocked and can thus not be opened by the user. If the actuation element 26 is configured in the form of a motion sensor, the authentication module 28 can be connected to an alarm module, not shown, that outputs an alarm, in particular an acoustic alarm, to protect against theft in the event of a detected movement of the lock 10 and of an unsuccessful authentication procedure.

It is understood that both the authentication procedure and the actual unlocking procedure require that the energy store 22 has sufficient energy. For the case that the energy store 22 is so discharged that an authentication and/or an unlocking is no longer possible, the mobile end device 30 has an emergency energy store 34, for example in the form of a power bank, and a connector element 36, here in the form of a USB plug, complementary to the connector element 24 of the lock 10 to connect the emergency energy store 34 of the mobile end device 30 to the connector element 24 of the lock and to charge the energy store 22 of the lock 10 at least so much that the authentication can be carried out and the lock 10 can be unlocked.

To protect the connector element 36 of the mobile end device 30 from contamination and/or damage, the connector element 36 can be retracted by a slider 37 into a housing 38 of the mobile end device 30 (FIG. 2D) and can be extended out of it again as required (FIG. 2C).

A second embodiment of the locking system is shown in FIG. 3 that only differs from the above-described first embodiment in that the mobile lock 10 is here not a hoop lock, but rather a frame lock attached to a frame 40 of a bicycle 42. This frame lock also has a lock body and a closing hoop that is lockable in the lock body that can be unlocked by means of an electric motor, with the unlocking of the closing hoop requiring, in the above-described manner, a positive authentication of a mobile end device 30 after the actuation of an actuation element of the lock 10.

A third embodiment of a locking system in accordance with the invention is shown in FIG. 4 that differs from the first embodiment described with reference to FIG. 1 in that the lock 10 is not a hoop lock, but rather a battery compartment lock that is attached to a frame 40 of a bicycle 42 and that serves the securing of a traction battery 44 of the bicycle 42. To this extent, this lock 10 does not have any closing hoop, but instead a latch, not shown in any more detail, for securing the traction battery 44 received in the battery compartment, said latch being movable into a release position by an electric motor of the lock to release the traction battery 44 as soon as a positive authentication of a mobile end device 30 has taken place after the actuation of an actuation element of the lock 10 in the above-described manner.

It is understood that a bicycle 42 can also be equipped with both a frame lock 10 of FIG. 3 and a battery compartment lock 10 of FIG. 4. It is advantageous in this case if both locks 10 can be unlocked using one and the same mobile end device 30. It is, however, generally also conceivable to provide separate mobile end devices 30 for unlocking the frame lock 10, on the one hand, and the battery compartment lock 10, on the other hand.

It is further understood that when the bicycle 42 is an e-bike, the battery compartment lock 10 and/or the frame lock 10 does/do not necessarily have to have their own energy store 22, but can instead be connected to the traction battery 44 of the bicycle 42 for the energy supply.

REFERENCE NUMERAL LIST 10 lock
12 closing hoop 14 lock body
16 locking element
18 locking recess
20 unlocking motor
22 energy store
24 connector element
26 actuation element
28 authentication module
29 transmission/reception unit
30 mobile end device
31 transmission/reception unit
32 switch-on element
34 emergency energy store
36 connector element
37 slider
38 housing
40 frame
42 bicycle
44 traction battery

The invention claimed is:

1. A locking system comprising:
a bicycle comprising an onboard computer removable by a user so that the user takes the onboard computer when leaving the bicycle;
a portable lock comprising
an unlocking motor; and
an authentication module configured to receive an authentication signal and authenticate the user, wherein the authentication module is only activated when the onboard computer is attached to the bicycle;
an actuation element coupled to the authentication module and actuatable by attaching the onboard computer to the bicycle causing the authentication module to be activated; and
a smart device configured to send the authentication signal to the authentication module,
wherein unlocking of the portable lock comprises:
first, attaching the onboard computer to the bicycle to activate the authentication module so that the authentication module is ready to receive the authentication signal from the smart device;
subsequent to the first step sending, via the smart device, the authentication signal to the authentication module; and
upon a successful authentication of the user by the authentication module, the unlocking motor is actuated to unlock the portable lock,
wherein the smart device is a smart phone, a smart watch, a remote control, or a portable computer, and
wherein the onboard computer and the smart device are separate components.

2. The locking system in accordance with claim 1, wherein the smart device comprises a transmission/reception unit to establish a wireless connection to the authentication module of the portable lock.

3. The locking system in accordance with claim 1, wherein the smart device has an energy store by which the portable lock is supplied with at least sufficient energy for an emergency unlocking.

4. The locking system in accordance with claim 1, wherein the portable lock and the smart device have complementary connector elements by means of which the smart device is connected to the portable lock for supply of energy to the portable lock.

5. The locking system in accordance with claim 4, wherein the connector elements comprise a USB plug and a USB socket; and/or
wherein the connector element of the smart device is movable between a passive position in which it is protected in a housing of the smart device and an active position in which it at least partly projects out of the housing and is couplable to the connector element of the portable lock.

6. The locking system in accordance with claim 1, wherein the locking system is a bicycle locking system.

7. The locking system in accordance with claim 1, wherein the portable lock is a bicycle frame lock or a bicycle battery compartment lock.

8. The locking system in accordance with claim 1, wherein the authentication takes place wirelessly.

9. The locking system in accordance with claim 1, wherein the authentication module comprises a transmission/reception unit to establish a wireless connection with the smart device of the user.

10. The locking system in accordance with claim 9, wherein the wireless connection is a Bluetooth connection.

11. The locking system in accordance with claim 1, further comprising a sensor for detecting a movement of the portable lock and an alarm module that is connected to the sensor and to the authentication module and that outputs an alarm in the event of a movement of the portable lock detected by the sensor and of an unsuccessful user authentication.

12. A method of unlocking a portable lock system that has an unlocking motor, an authentication module, and an actuation element actuable by a user, the method comprising
activating the authentication module by actuating the actuation element by attaching a removable onboard computer to a bicycle;
subsequent to activating the authentication module, receiving an authentication signal from a smart device to the authentication module, the smart device being separate from the onboard computer, wherein the smart device is a smart phone, a smart watch, a remote control, or a portable computer;
authenticating, via the authentication module, the user; and
in the event of the activation of the actuation element followed by a successful authentication of the user and of the actuation of the actuation element, activating the unlocking motor to unlock the portable lock.

13. The method in accordance with claim 12, wherein receiving the authentication signal from the smart device comprises:
wirelessly receiving the authentication signal.

* * * * *